Patented Mar. 4, 1930

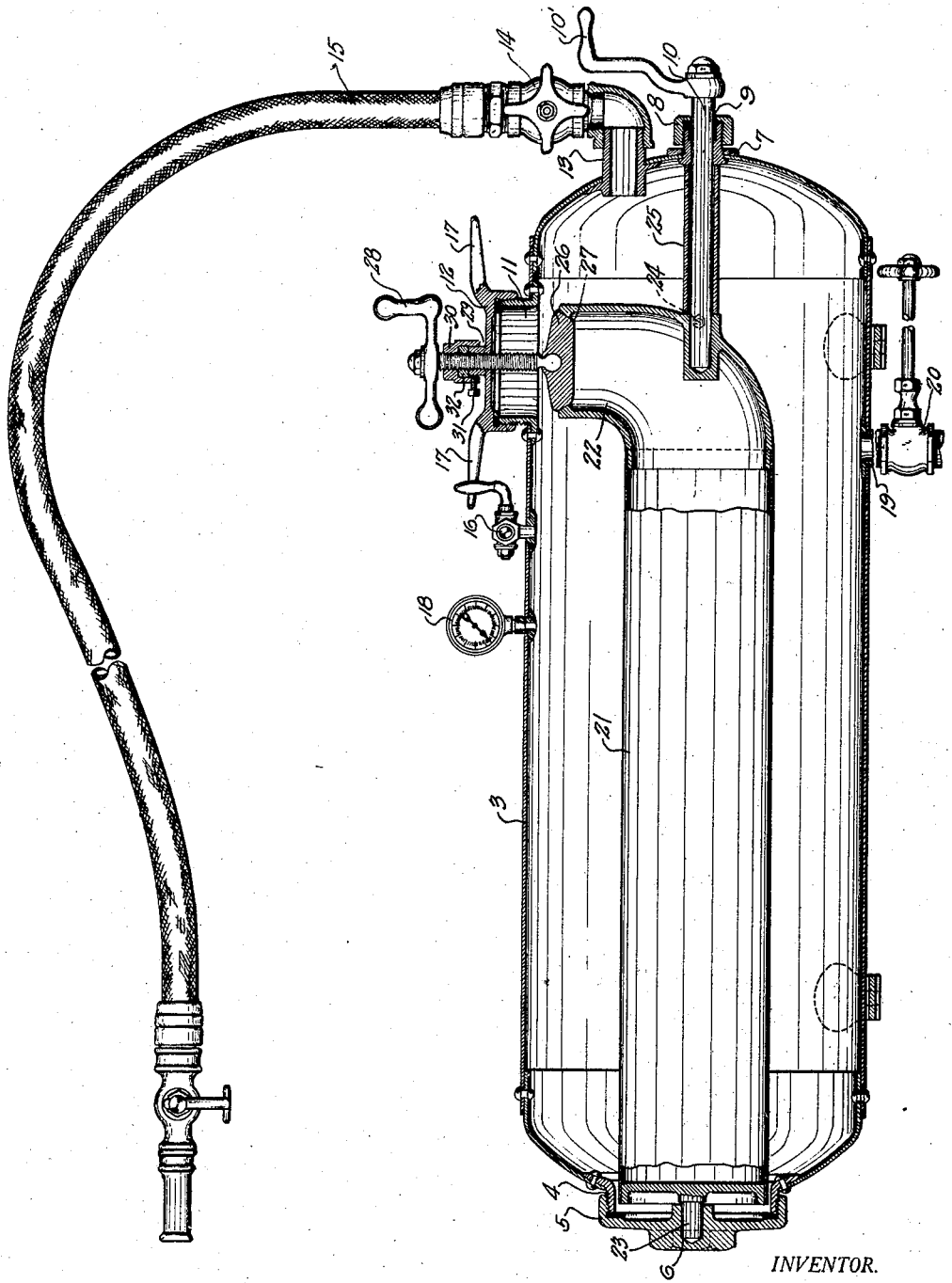

1,748,992

UNITED STATES PATENT OFFICE

WILLIAM R. PIRSCH, OF KENOSHA, WISCONSIN, ASSIGNOR TO PETER PIRSCH AND SONS CO., OF KENOSHA, WISCONSIN, A FIRM COMPOSED OF PETER PIRSCH, W. R. PIRSCH, AND CEILA PIRSCH EVEN

FOAM-GENERATING TANK

Application filed September 20, 1926. Serial No. 136,549.

This invention relates to improvements in foam generating tanks.

A further object of this invention is to provide a tank in which one chemical solution is carried in an outer container, and another chemical solution is carried in an inner pivotally mounted container, the contents of which may be readily discharged into the outer container by partially rotating the inner container.

A further object of the invention is to provide a foam generating tank having an inner container formed with a normally upturned spout portion, and to provide means for sealing the spout when the tank is not in use, and means for reversing the position of the spout when the contents of the inner container is to be discharged into the outer container to produce the desired chemical reaction.

With the above main and other incidental objects in view, the invention consists of the improved foam generating tank and all its parts and combinations as set forth in the claims, and all equivalents thereof.

The accompanying drawing shows a longitudinal section of the improved foam generating tank, part of the inner container being shown in full and part being shown in section.

Referring to the drawing, the numeral 3 designates the outer container which is provided at one end with an opening having an exteriorly threaded collar 4, riveted thereto. This opening is provided to permit insertion or removal of the inner container, in case it is desired to replace it or to clean it out. Said collar is adapted to receive an interiorly threaded cap 5, which is formed with a medial socket 6. The outer container is provided at its other end with a smaller threaded collar 7 arranged to receive a cap 8. The cap is formed with a central opening 9 for receiving a shaft 10. Said shaft is provided with a handle 10'. The outer container also has a threaded collar on its upper portion to form a filling opening 11. A filling opening cap 12 is threaded on the collar. At one end of the tank is an outlet pipe 13 to which is connected valve mechanism 14 and a hose 15. A relief valve 16 is provided with a handle which is arranged to be operated by the arms 17 of the filling opening cap when the latter is being removed. This allows the gas to automatically escape through the relief valve when the filling opening cap is being removed and thereby prevents injury to the operator by the cap being forced suddenly upward while it is being unscrewed. The outer container is also provided with a gauge 18, and a lower outlet 19 and valve 20.

The inner container 21 is cylindrical in shape and is formed at one end with a normally upward spout portion 22. At its other end the container has a projecting pin 23 which rests in the socket 6 of the cap 5 to pivot the inner container. At the spout end of the container, the shaft 10 is fixedly secured as at 24. The shaft, which revolves in a shaft receiving tube 25, causes the inner container to reverse its position and to discharge its contents into the outer container. A valve 26, closes or opens the opening 27 of the spout 22. The valve is operated by a threaded stem which extends through a threaded collar portion 29 projecting from the filling opening cap 12, and is operated by a crank handle 28. A nut 30 is also threaded to the stem above the collar portion and is adapted to be locked to the collar by a bolt 31. A washer 32 is positioned between the nut 30 and the collar portion 29.

To prepare the tank for operation, the inner container is first filled with one chemical solution, and the outer container is filled with another. The cap 12 is then placed on to seal the outer container, and the crank 28 is turned to cause the valve 26 to seal the inner container. When it is desired to operate the tank, the crank 28 is turned upwardly to open the spout of the inner container. The crank handle 10' is then given one-half a turn, which causes the inner container to reverse its position, and to discharge its contents into the outer container. The two chemicals are of such a nature that when they combine, they expand eleven times, and generate great quantities of foam. This foam naturally exerts a great outward force, so that when the valve 14 of the outlet pipe is opened, the foam is forced out through the hose 15.

From the foregoing description, it may be seen that the foam generating tank is simple in construction, is strong and durable, is simple in operation, and is well adapted for the purpose described.

What I claim as my invention is:

1. A foam generating tank comprising an outer container, an inner container pivotally mounted therein and having an open and a closed end, said open end portion being bent at substantially a right angle to form a spout, and means for rotating the inner container on its pivot to reverse the position of the spout and to thereby cause the contents of the inner container to be discharged into the outer container.

2. A foam generating tank comprising an outer container, an inner container pivotally mounted therein and having an open and a closed end, said open end portion being bent at substantially a right angle to form a spout, means for rotating the inner container on its pivot to reverse the position of the spout and to thereby cause the contents of the inner container to be discharged into the outer container, and means for removably closing said open end of the inner container.

In testimony whereof, I affix my signature.

WILLIAM R. PIRSCH.